UNITED STATES PATENT OFFICE.

MICHAEL HACKETT, OF NEW YORK, N. Y.

SHOE-POLISH.

SPECIFICATION forming part of Letters Patent No. 259,009, dated June 6, 1882.

Application filed January 11, 1882. (Specimens.)

*To all whom it may concern:*

Be it known that I, MICHAEL HACKETT, a citizen of the United States, residing in the city, county, and State of New York, have invented a new and useful composition of matter to be used as a high and durable polish on ladies' and gentlemen's boots and shoes, and that the same is, I believe, more durable and of higher luster than any compound heretofore known or used for that purpose.

My composition consists of the following ingredients, combined in the proportions stated, viz: half-pint good black ink, half-pint of port-wine, four ounces gum-arabic, two ounces brown rock-candy, two and a half ounces spirits of wine. The good black ink above stated is the well-known writing-ink composed of three parts of nut-gall and one part of sulphate of iron, with gum-arabic and water.

Directions for making the polish: Put the port-wine and ink together in a vessel over a fire until it has boiled for five minutes. Then add the rock-candy and gum-arabic. Let the whole simmer two hours, stirring it all the time, else it will be worthless. Take it off the fire and let it stand twenty-four hours. Then, if it is quite cold, add the spirits of wine and stir the whole till it becomes thoroughly mixed. Let it then be bottled tight and stand three or four days, when it will be ready for use.

Directions for using the polish: If the boots or shoes are soiled with mud, wash off with a damp cloth and then rub with a dry cloth, or, if they are dusty, simply remove the dust, and they are then ready to receive the polish, which may be applied with a fine brush or with the finger. The full polish is then on without any further rubbing or polishing. On patent-leather or any other leather boots or shoes it will last eight or ten days, without they are wet with mud or water.

Having now fully described my invention, what I claim, and desire to secure by Letters Patent, is—

The herein-described composition of matter, consisting of black ink produced from nut-gall and sulphate of iron, port-wine, gum-arabic, brown rock-candy, and spirits of wine, combined in the proportions herein named, substantially as and for the purposes described.

MICHAEL HACKETT.

Witnesses:
 THOS. A. DAVIES,
 THOMAS HINES.